United States Patent [19]

Watkin

[11] 4,054,823
[45] Oct. 18, 1977

[54] CONTROL APPARATUS FOR MANUFACTURING SYSTEMS

[75] Inventor: David Anthony Watkin, Bromley, England

[73] Assignee: Watkin Elliott Systems Engineers Limited, England

[21] Appl. No.: 608,372

[22] Filed: Aug. 27, 1975

[30] Foreign Application Priority Data

Aug. 28, 1974 United Kingdom ............ 37592/74

[51] Int. Cl.² ........................................... G05B 19/28
[52] U.S. Cl. ................................... 318/603; 318/59; 318/85; 198/503
[58] Field of Search .................. 318/59, 66, 85, 314, 318/39, 603; 198/575, 576, 577, 502, 503

[56] References Cited

U.S. PATENT DOCUMENTS

| | | | |
|---|---|---|---|
| 3,485,339 | 12/1969 | Miller et al. | 198/503 |
| 3,593,008 | 7/1971 | DeWitt et al. | 198/503 |
| 3,646,417 | 2/1972 | Cassie et al. | 318/318 |
| 3,668,498 | 6/1972 | Austin | 318/85 |
| 3,838,321 | 9/1974 | Damm et al. | 318/66 |
| 3,923,147 | 12/1975 | Quinn | 318/85 |

Primary Examiner—Robert K. Schaefer
Assistant Examiner—John J. Feldhaus
Attorney, Agent, or Firm—William Anthony Drucker

[57] ABSTRACT

A control apparatus for manufacturing or treatment processes in which articles or batches of articles are conveyed through a process station on endless conveyor means. The apparatus comprises electrical signal producing means for producing at its output an article or batch digital signal dependent upon the length of the conveyor means associated with one article or batch of articles. Electrical reference means capable of being set with a digital value representing the effective length of the conveyor means are provided together with electrical comparator means for receiving the signals at the outputs of said signal producing means and said reference means and for determining whether the effective length of the conveyor is an exact multiple of the length associated with the article or batch. The comparator means produces at its output a signal proportional to the deviation from the exact multiple, which serves to effect an increase or decrease of the speed of the drive means whereby an exact multiple is achieved.

15 Claims, 6 Drawing Figures

1

CONTROL APPARATUS FOR MANUFACTURING SYSTEMS

BACKGROUND TO THE INVENTION

This invention relates to the automatic control of manufacturing processes or assembly lines in which articles are conveyed through a series of processes, conveying stations and/or operations, which will be referred to generally as process stations.

More specifically the invention relates to the control of the mechanical handling systems and the speeds of operation of the conveyor systems within a batch manufacturing system. Such systems include plants for the manufacture of pies, loaves, biscuits, etc., or any item initially produced in batches. Items of this type pass through various processes during their manufacture from initial forming to the completed and finished commodity. The control system is not limited to foodstuffs but may be used for the manufacture of any batch produced item which passes through several processes and is transferred from station to station by continuously moving conveyor or cyclic mechanical handling means.

Existing systems have disadvantages because each process in the system must have a finite time to be completed. Each process time will probably be different and may be required to be changed during the manufacturing day, to produce a satisfactory product. This means that bunching between processes may occur or inter-process storage may be required.

OBJECT OF THE INVENTION

An object of the present invention is to provide a control system in which the time spent by each article or batch of articles during each process is matched to the rate of delivery of that process in order to prevent the build up of articles at or between the process stations. By this means, inter-process storage is not required.

SUMMARY OF THE INVENTION

According to the invention we provide a control apparatus for manufacturing or treatment processes in which articles or batches of articles are conveyed through at least one process station on endless conveyor means driven by a variable speed electrically controlled drive means, electrical signal producing means for producing at its output an article or batch digital signal dependant upon the length of the conveyor means associated with one article or batch of articles, electrical counter means capable of being set with a digital value representing the effective length of the conveyor means, electrical comparator means for receiving the signals at the outputs of said signal producing means and said counter means and for determining whether the effective length of the conveyor is an exact multiple of the length associated with the article or batch, said comparator means producing at its output a signal proportional to the deviation from the exact multiple, which serves to effect an increase or decrease of the speed of the drive means whereby an exact multiple is achieved.

Each process is automatically controlled to the nearest speed or process time required by the operator in keeping with a master control and the inter-process transfer systems are automatically controlled to match each process. The whole system may be monitored and controlled by a master oscillator or pulse generator.

This enables the transfer operations between process stations to be kept in phase with each other further. Any machine or single process within the sequence of processes may be stopped and when re-started will automatically be brought to the correct speed and phase in synchronism with the rest of the processes.

The system provides a method for manufacture and/or treatment of an article or batches of articles in a number of sequential process stations, wherein the articles or batches of articles are transferred from one process station to the next by electrically driven transfer means controlled by a master clock oscillator or pulse generator, whereby the time spent by each article or batch of articles in each process station can be matched to the rate of delivery to that station in order to prevent the build up of articles at or between the process stations.

The system will control any individual machine to a desired speed phase to a high accuracy by means of a crystal clock.

BRIEF DESCRIPTION OF THE DRAWINGS

A constructional embodiment of the invention will now be described by way of example with reference to the accompanying drawings, in which.

DESCRIPTION OF PREFERRED EMBODIMENT

Figure 1:
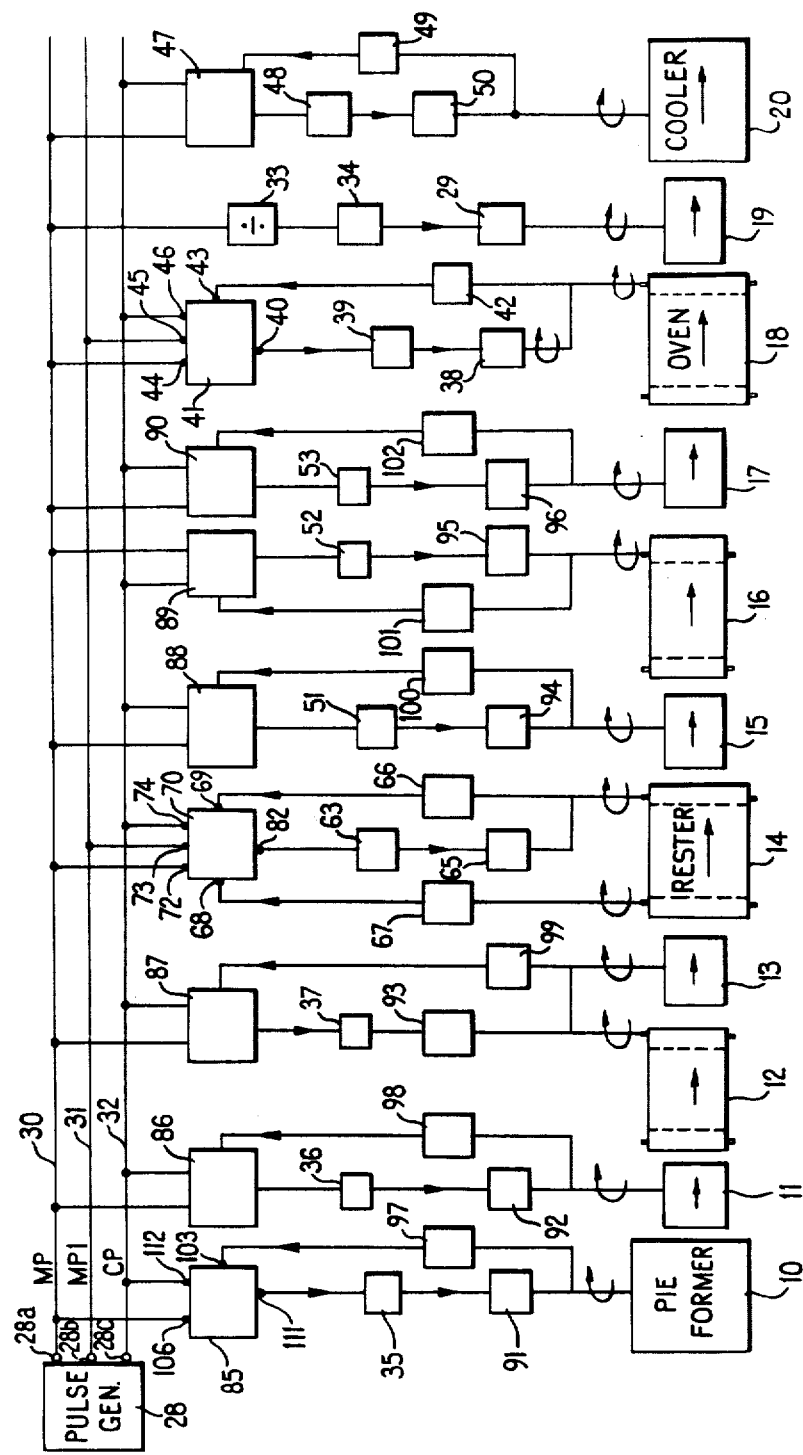
FIG. 1 is a general layout of a batch system for manufacturing pies and includes a pie forming machine, a rester in which the pies prove, and an oven.

The general layout of a batch system is shown in FIG. 1. The system indicated is for the formation and baking of pies and comprises a known pie forming machine 10 producing uncooked pies in batches of a given number. A cyclic transfer mechanism 11 of known construction transfers the parallel batches of pies from the pie forming machine 10 to a conveyor belt 12 and thereafter by way of a further cyclic transfer mechanism 13 to a rester 14.

The rester is a large enclosure through which the pies are transported. The atmosphere in the rester is controlled to a given temperature and humidity to allow the pastry of the pie to prove. The time in the rester is determined by the speed and length of the rester conveyor within the rester. No further description is given since the rester may be of known construction. Another cyclic transfer mechanism 15 transfers the pies from the rester 14 to another conveyor belt 16 which carries the pies from the rester towards an oven 18. Transfer from the belt 16 to the oven 18 is effected by another cyclic transfer mechanism 17.

The oven cooks the pies to the required finish, the amount of cooking being determined by the time in the oven and its temperature. The time in the oven is determined by the speed of the oven conveyor.

An unloading bar 19 unloads the pies from the oven onto a final conveyor and cooler 20.

Figure 2:
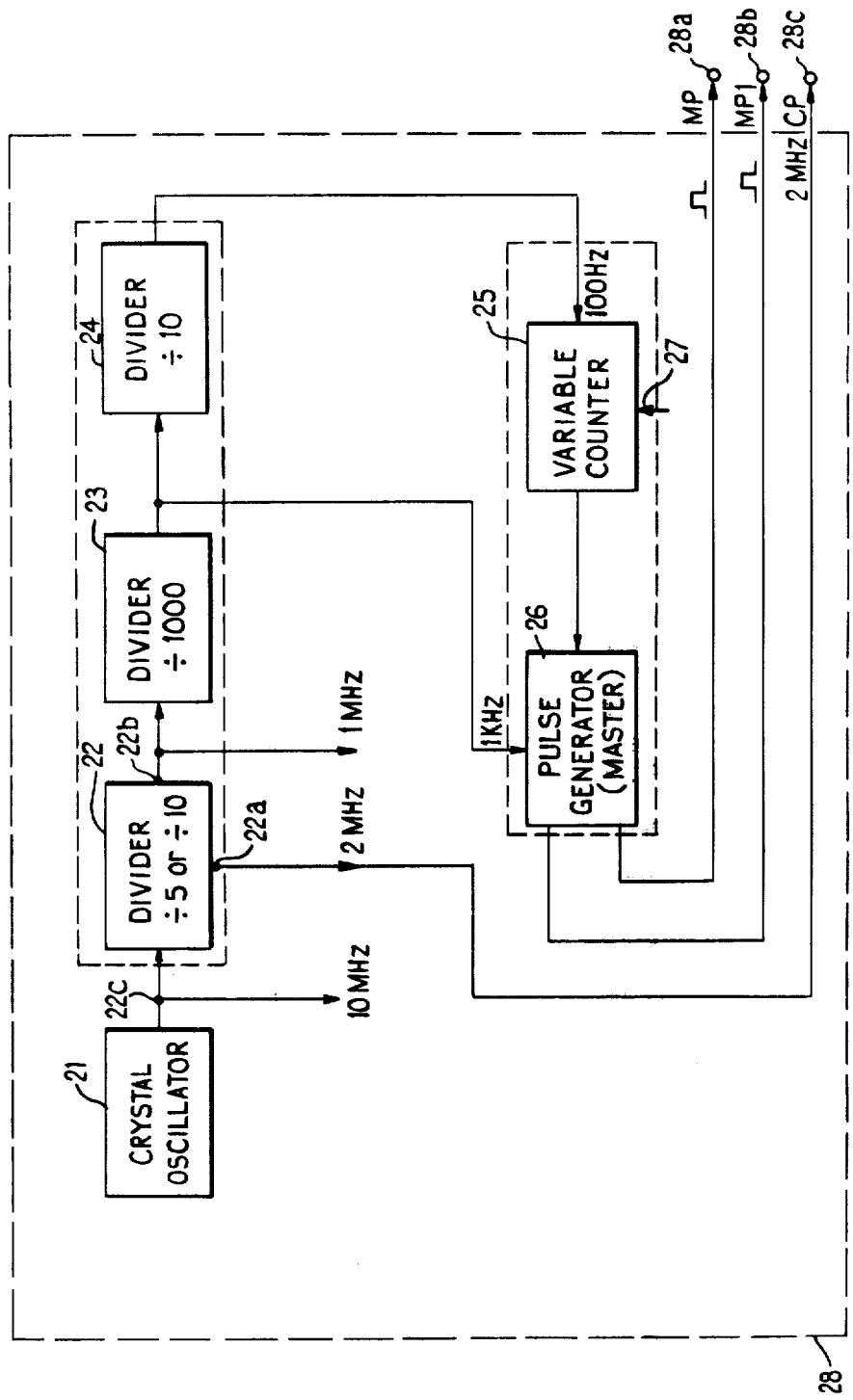
FIG. 2 shows a pulse generator circuit.

Items 10–18 are phase and speed controlled by pulses received on lines 30, 31 and 32, from outputs 28a, 28b, and 28c respectively of a pulse generator 28 which controls the overall speed of the system. The unloader 19 is driven by a motor 29 intermittently controlled by a pulse from the master oscillator which is divided by divider 33 to one fifth the master pulse frequency. A speed adjuster 34 is provided between motor 29 and divider 33. The pulse generator (see FIG. 2) comprises a crystal oscillator 21 (consisting of a crystal and integrated circuit, Texas Instruments 7400) having its output connected to a divider 22 to provide clock pulses therefrom at one fifth or one tenth of the oscillator frequency at outputs 22a and 22b respectively for use as described below. The frequency of the oscillator is set at 10 MHz so that the selectable driving clock pulses of 2MHz or 1MHz frequency can be obtained from 22a and 22b respectively. If desired a further tap 22c may be taken at the input of the divider for a 10 MHz pulse source. A 2MHz driving pulse frequency has been selected in this example.

Further division by a divider 23 and 24 produces 1KHz signal and 100 Hz signals respectively. The dividing circuits are standard electronic integrated circuit components (e.g. 7490 Texas) and are well known.

The 1 KHz pulse source at the output of the divider 23 is also fed to a master clock pulse generator 26 incorporating integrated circuits (e.g. Texas 7474 and 7473/40) which produces two master clock pulses of 1ms pulse width; the second pulse initiated by the end of the first pulse. The frequency of these pulses is settable between one pair of pulses per 0.01 seconds and one pair per 9.99 seconds by means of a variable counter 25 (Texas 7490, 7485) connected to receive the 100 Hz pulse source from the divider 24 and which may be set by digital input means not shown entered at 27.

The speeds of the rester 14 and oven 18 are initially set by the operator to give correct forming and cooking respectively and the control circuits for the rester and oven described below in relation to FIGS. 4 and 3 respectively trim these speeds to the nearest desired speed and to give the correct orientation for the transfer mechanisms and conveyors. The whole system is locked to the master clock pulses. Thus the overall speed of the system may be changed by adjusting the frequency of the master pulse by resetting the variable counter 25.

The oven 18 may be a known construction having an endless conveyor belt of chain links driven by sprockets (not shown) from a motor 38. The speed of the motor 38 is controlled by an adjuster 39 (e.g. a star drive manufactured by Thorn) connected to the output 40 of an oven control circuit 41. A tachogenerator 42 connected to the drive shaft of the sprockets provides an output in pulse form indicative of the speed of the oven conveyor belt, which output is fed to said control circuit 41 at input connection 43. Other inputs 44, 45 and 46 of the control circuit are connected respectively with the rails 30, 31 and 32 providing the master and driving clock pulses.

Figure 3:
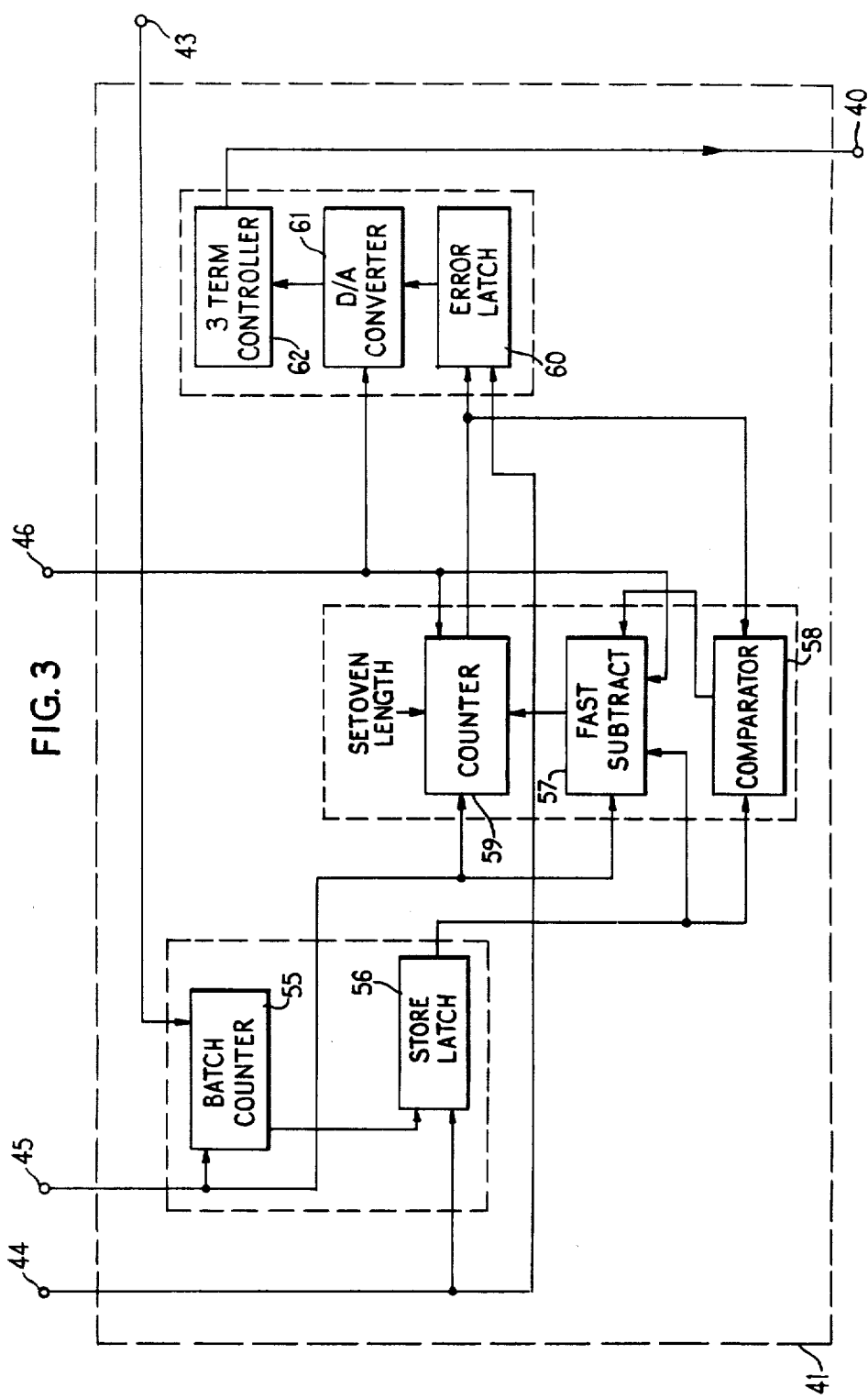
FIG. 3 shows a speed control circuit for the oven.

The oven speed control circuit 41 is shown in block diagram form in FIG. 3. It is similar in operation to the rester speed control circuit to be described below except that the oven length number counter is not updated. This is because the oven conveyor is not so long and is not liable to stretch. The oven length can therefore be regarded as constant.

The oven speed control circuit 41 comprises a counter 55 (e.g. Texas 7493) connected between the input terminal 43 and a store 56 (e.g. Texas 7475 latch). The counter 55 and the store 56 are connected to the input terminals 45 and 44 respectively. The output of the store 56 provides a binary digital number applied to the inputs of a fast subtractor circuit 57 (e.g. Texas 74193/7400) and a comparator 58 (e.g. Texas 7485/7430). A counter 59 (e.g. Texas 74193) includes a store which may be set in accordance with a value representing the oven length, is connected between the fast subtractor 57 and both the comparator 58 and an error latch circuit 60 (e.g. Texas 7475). The digital value of the error appearing at the output of error latch 60 is converted to an analogue value at terminal 40 by means of an analogue to digital converter 61 (e.g. Texas 7485/7493) and a three term controller 62 (e.g. Texas 741).

Pulses at input 43 received from the tachometer 42 are fed to the counter 55 which transfers its count representing a batch length to the store 56 on receipt of a master clock pulse from the terminal 44. On receipt of a master clock pulse from terminal 45 the counter resets and restarts counting. The number transferred to the store 56 is successively subtracted from the oven length number set in counter 59 at a speed set by the driving clock pulses arriving from terminal 46 and the remainder at each successive subtraction is examined by the comparator 58. If the remainder is greater than half the batch number in store 56, another subtraction is made, and if this is less than half the batch number in the store, the subtraction is halted. At the next master clock pulse on 44 the remainder is transferred to the error latch 60. The master clock pulse on 45 inputs the oven length into counter 59. The remainder in error latch 60 is converted to analogue in 61 and used to trim the oven speed by the appropriate amount via 3 term controller 62. Thus the oven speed is trimmed so that an exact number of batches fits onto the oven length and the items are in the correct position to be removed by the transfer mechanism 19.

The rester 14 (see FIG. 1) consists of an enclosure having a conveyor system (not shown) inside. The items to be treated (in this case pies) are thus subjected to the required atmospheric environment in which to "prove" during a predetermined period. The main speed of the conveyor system is set up by the operator for a particular item and is controlled by the main rester speed control by known equipment (not shown) which is not the subject of the present invention.

The rester conveyor is very long and is usually heavily loaded. The conveyor is therefore liable to stretch depending upon load and this affects the exact travel time of an item through the rester.

The conveyor which may be of chain-like construction, is carried by drive sprockets at the delivery end and by idling sprockets at the fed end. The drive sprockets are driven at the delivery end of the conveyor by means of a drive motor 65.

A digital tachometer 66 is attached to and driven by the input shaft carrying the drive sprockets, and a second digital tachometer 67 is attached to and driven by a shaft carrying the idling sprockets.

The digital tachometers produce one output pulse per given angle of rotation of their input shafts and hence one pulse per given angle of rotation of the shaft to which they are attached. If the length of the conveyor in the rester is constant, the output pulses per given period of time from tachometer 66 and tachometer 67 will be the same, as the sprockets will be connected by a fixed length of conveyor. However if the conveyor length varies because of stretch, the input tachometer 66 will produce fewer pulses in a given period of time than tachometer 67.

Figure 4:
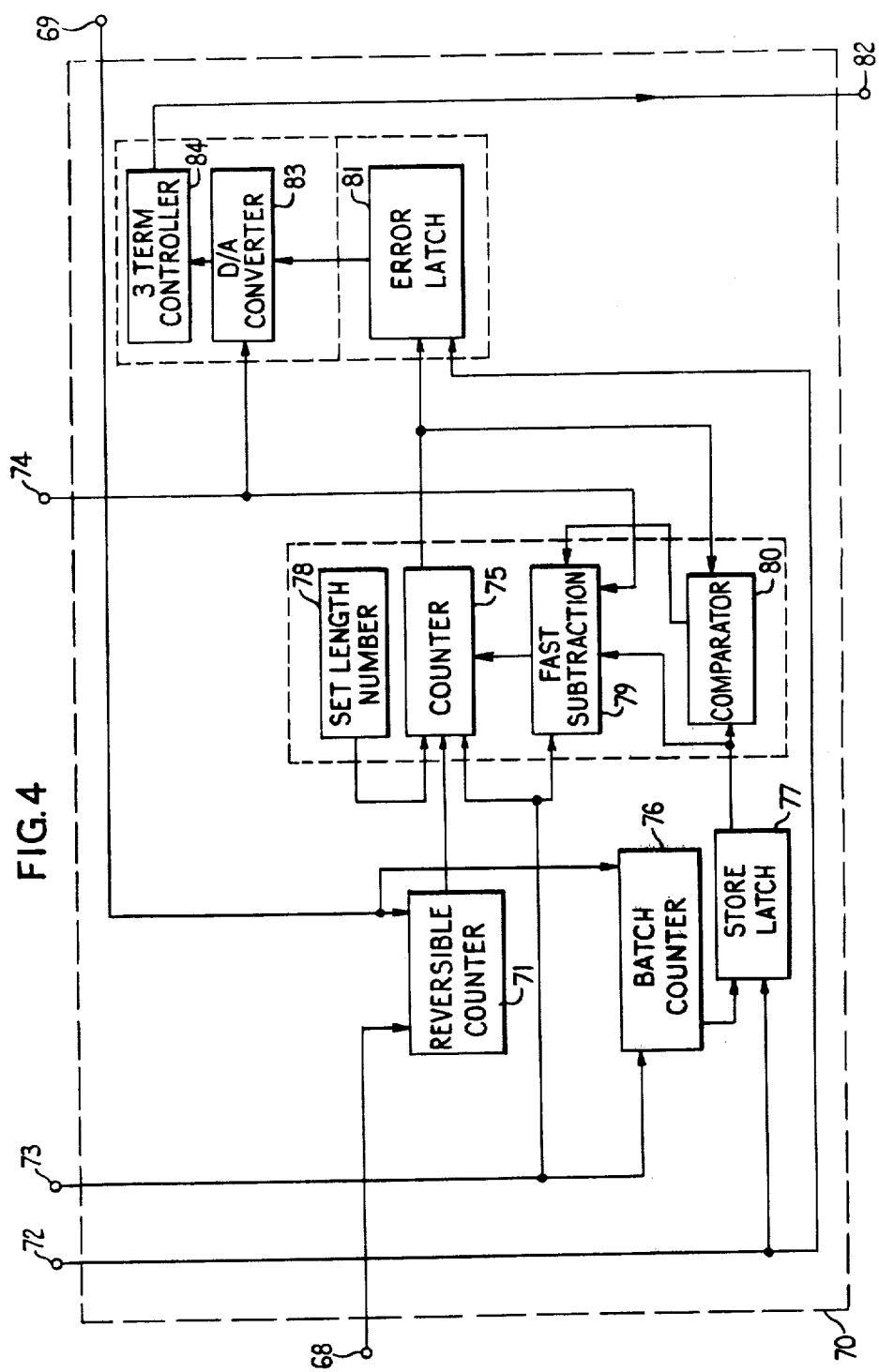
FIG. 4 shows a speed control circuit for the rester.

The output of the tachometers 66, 67 are connected to input terminals 69, 68 respectively of a rester speed control circuit 70 shown in detail in FIG. 4 the input connectors 72, 73 and 74 are connected respectively with the rails 30, 31 and 32. The control circuit 70 includes counter 75 (e.g. Texas 74193) into which a value can be set representing the length of the rester conveyor plus the content of reversible counter 71 which represents the stretch.

Pulses received at input 68 from tachometer 67 cause the counter 71 to count upwards whereas pulses received at input 69 from tachometer 66 cause the counter to count downwards.

At the end of a period of time set by the master clock pulse the sum of the number in the reversible counter 71 and the set length number 78 is set into counter 75. If there is no stretch or change in the rester conveyor during the master pulse period, pulses from tachometers 66, 67 will be equal and the output from counter will be the rester length number as before. Thus no adjustment will be made to the rester length number in this case. If stretch has occurred, the rester length number set in the counter 75 will be updated.

The number of pulses from tachometer 66 between master clock pulses is also recorded by a batch pulse counter 76 (e.g. Texas 7493) and is fed to a store latch circuit 77 (e.g. Texas 7475). Counter 76 thus counts the pulses from tachometer 66 and at each master clock pulse it transfers the count into store, resets on the receipt of the delayed master clock pulse and restarts counting.

During the period between master clock pulses, the number from store 77 is successively subtracted by means of subtractor 79 from the number set into the rester length number in counter 75 at a speed governed by the driving clock pulses. After each subtraction, a comparison on the remainder is made by the comparator 80 (e.g. Texas 7485/7430). If the remainder is greater than half the batch count stored in store 77, another subtraction takes place. If the remainder is less than half the batch count stored in store 77 the subtraction is halted. At the next master clock pulse on 72 the digital valve of the remainder is transferred to error latch 81. Counter 75 is reset to the updated oven length. The remainder at the output of a latch 81 (e.g. Texas 7475) is converted to an analogue value at the output terminal 82 by means of an analogue to digital converter 83 (e.g. Texas 7485/7493) and a three term controller 84 (e.g. Texas 741) and the rester drive speed adjuster 63 of FIG. 1 is trimmed in the appropriate direction by an appropriate amount. The speed of the motor 65 is thus trimmed to produce a zero remainder from the successive subtractions. When this occurs, the speed of the rester conveyor is such that the items in it (i.e. pies) will be in the correct position to be transferred by the transfer mechanism 15, and the rester speed itself is such that an exact number of batches fit onto its conveyor length, i.e. the pulses per batch are an exact multiple of rester conveyor length.

If the speed of any single process needs to be changed to suit the product, this may be done by the operated by means of a desired speed potentiometer or similar means in the motor circuit and the system will train this required speed to match the rest of the processes in the system, i.e. the motor speed may be increased or decreased but batches will still be matched to the length of the conveyor in the process.

The conveyors and transfer mechanisms designated in FIG. 1 as 10/11, 12/13, 15, 16 and 17 are each controlled by a cyclic control circuit designated respectively 85, 86, 87, 88, 89 and 90.

The pie former 10 is driven by a motor 91 and the transfer mechanism 11 by a motor 92.

The conveyor 12 and transfer mechanism 13 are linked mechanically and are driven by a motor 93.

The transfer mechanism 15, conveyor 16 and transfer mechanism 17 are driven by motors 94, 95 and 96. A digital tachometer (97-102) is attached to the shaft of each drive motor (91-96) and a pulse is obtained per given angle of rotation. Speed adjusters 35, 36, 37 and 51, 52, 53 (similar to speed adjuster 63) are provided between motors and control circuits.

A similar arrangement can be provided for cooler 20 and is shown comprising a control circuit 47, speed adjuster 48, tachometer 49 and motor 50, although for some applications this would not be necessary.

Figure 5:
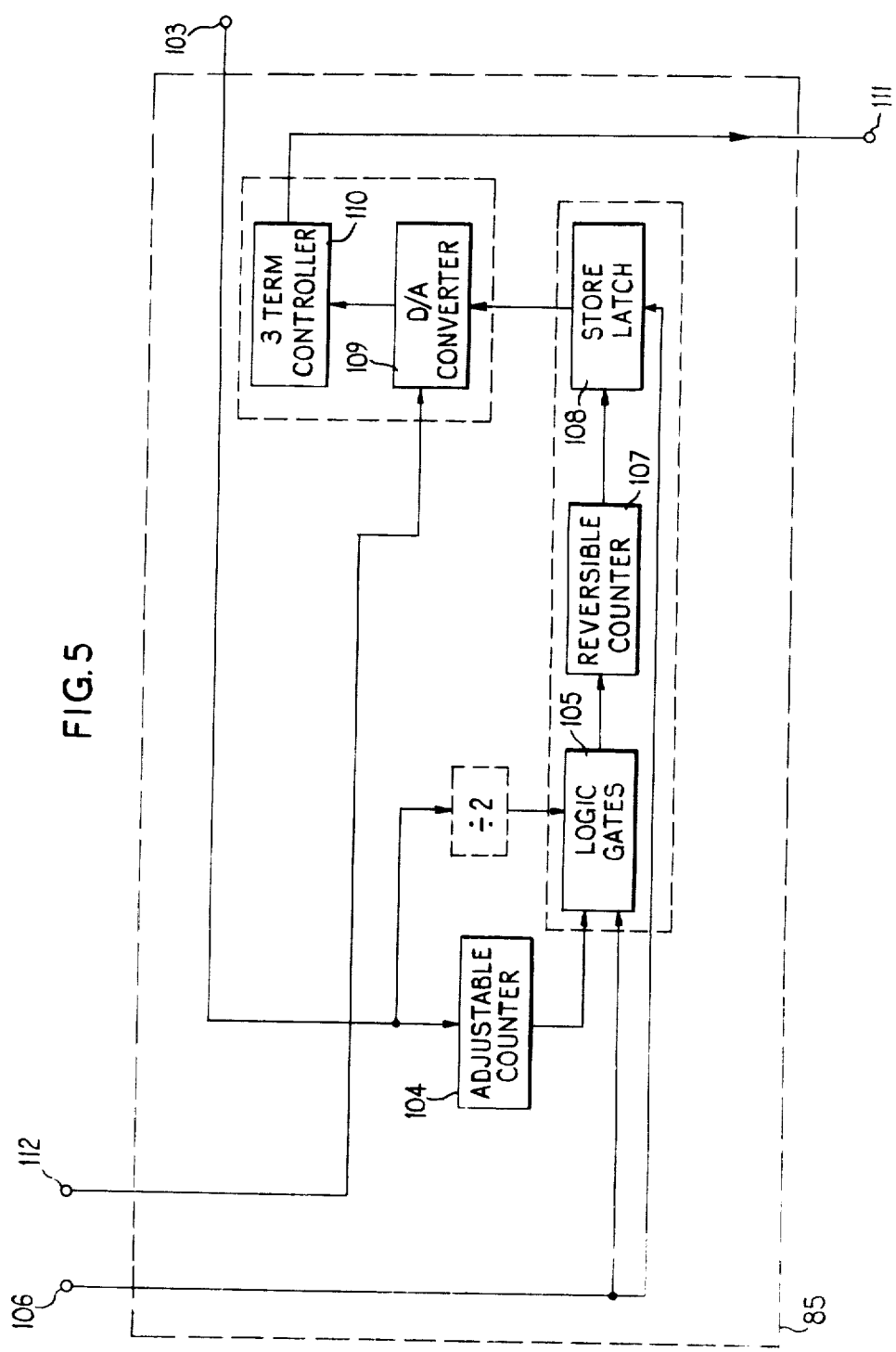
FIG. 5 shows a cyclic control circuit for each motor driving a process station.

One of the cyclic control circuits 85 is shown in detail in FIG. 5.

As seen from FIG. 5, pulses from the tachometer are fed to input 103 to which is connected to a programmable counter 104 (e.g. Texas 74193) so that one pulse per cycle of the driven mechanism is obtained at the output. The required dividing factor is programmed into the counter 104 in accordance with the period of operation of the particular cyclic mechanism driven. Thus one timing pulse per cycle of the pie forming machine or the transfer mechanisms is obtained or one timing pulse per conveyor batch length in the case of conveyors, is obtained.

This timing pulse is fed to a logic circuit 105 (e.g. Texas 7400) together with the master clock pulse entering at input 106. The logic gate 105 determines whether the timing pulse from the counter 104 or the master clock pulse at input 106 arrives first. If the master pulse arrives first, the mechanism is being driven too slowly and action is taken by the cyclic control circuit to increase the speed of the motor.

The master clock pulse that arrives first sets the logic gate 105 to enable the reversible counter 107 to count up the pulses from input 103 divided by 2. In this case the counting of 107 is stopped when the timing pulse from 104 occurs. The next master clock pulse at 106 transfers the counter 107 output to store latch 108. The store latch 108 output is converted by digital to analogue converter 109 to a positive analogue signal proportional to the number. This signal is used to speed up the cyclic mechanism via the three term controller 110. The reversible counter 107 is reset to zero by the leading edge of the next pulse (master clock or timing pulse) to enable the counting by counter 107.

Conversely, if the timing pulse arrrives first, the mechanism is being driven too fast and the speed of the motor is reduced. This is achieved in a similar manner by the timing pulse enabling the reversible counter 107 to count down. The master clock pulse is this time used to stop the counting. The resultant complement of a negative number is converted by converter 109 to a negative analogue signal which is used to slow the motor down. The length of time between the master pulses determines the magnitude of adjustment made to the speeds. By means of the cyclic control circuit the transfer mechanisms and conveyors are locked to the master pulse and each batch of items arrives at the correct transfer point at the correct time.

Figure 6:
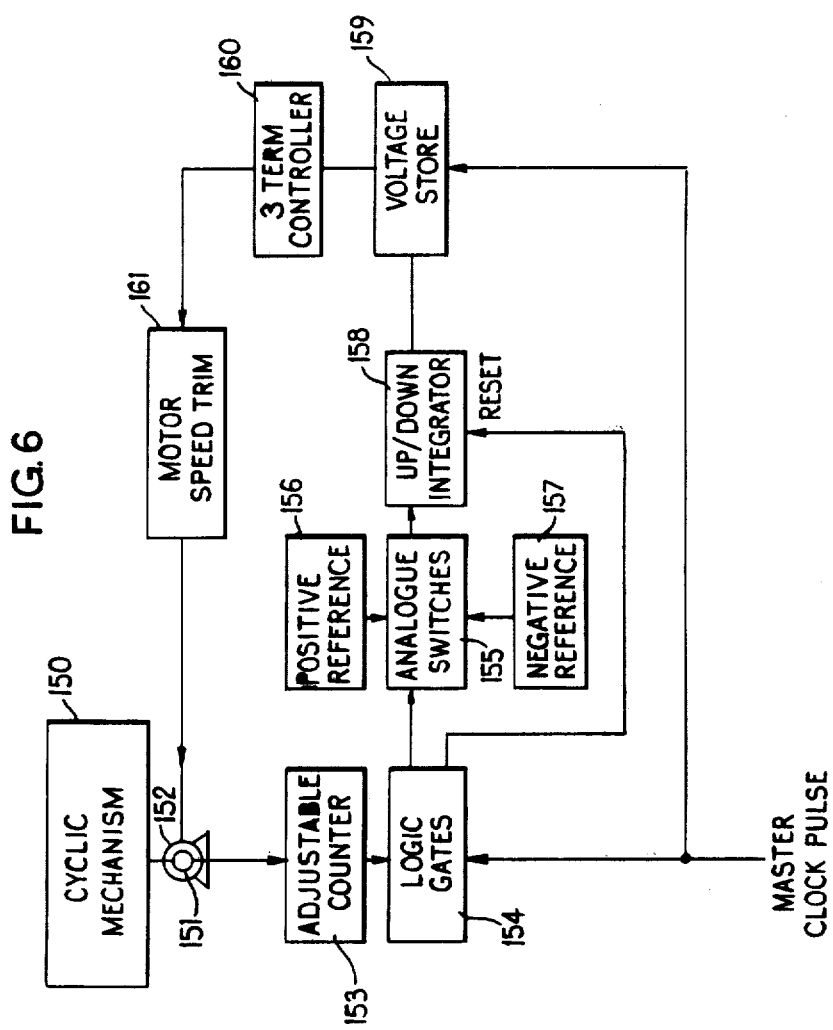
FIG. 6 shows a cyclic control circuit using analogue components.

Although digital means are described in the above example, analogue techniques may be used for parts of the systems. In this case, digital counters may be replaced by voltage integrators and the outputs would be fed to voltage stores. An example system is shown in FIG. 6, for controlling a cyclic mechanism, 150.

The basic layout is as for a digital system except that the logic gates 154 control analogue switches 155 which feed up/down integrator 158. When a master pulse occurs first the integrator 158 is allowed to integrate up until stopped by the timing pulse. The positive voltage is transferred to the voltage store 159 and at the next master clock pulse is used to speed up the motor via three term controller 160 and motor speed trim 161.

When a timing pulse occurs first the integrator 158 is allowed to integrate down until stopped by the master pulse. The negative voltage is transferred to the voltage store 159 and at the next master clock pulse is used to slow down the motor 152 via three term controller 160.

Counters and store latches throughout the digital system can sometimes be replaced by analogue integrators and voltage stores. The digital tachometers, crystal oscillator and master pulse generator would remain the same.

In all cases in the digital system, the circuits described by the block diagrams may be made up of standard integrated circuits such as binary and decimal counters, bistable circuits and logic gates. All these circuit techniques are well known.

In the analogue system, integrators, comparators and sample and hold circuits may be used, again using standard operational amplifiers. The techniques for these circuits are also well known.

I claim:

1. A control apparatus for manufacturing and treatment processes in which articles or batches of articles are conveyed through a process station on endless conveyor means driven by a variable speed electrically controlled drive means, said apparatus comprising electrical signal producing means for producing at its output an article or batch digital signal dependant upon the length of the conveyor means associated with one article or batch of articles, electrical reference means capable of being set with a digital value representing the effective length of the conveyor means, electrical comparator means for receiving the signals at the outputs of said signal producing means and said reference means and for determining whether the effective length of the conveyor is an exact multiple of the length associated with the article or batch, said comparator means producing at its output a signal proportional to the deviation from the exact multiple which serves to effect an increase or decrease of the speed of the drive means whereby an exact multiple is achieved.

2. A control apparatus according to claim 1, in which said reference means comprises a settable digital counter and wherein a subtractor connected to said comparator means effects sequential subtraction of said article or batch signal from said counter, said comparator means effecting a comparison of the signal at the output of the counter after each subtraction with the article or batch signal from said electrical signal producing means and producing at the output of said comparator a signal which serves to enable the subtractor until the reducing number in the counter is below a predetermined value whereupon said comparator produces a compensating signal which serves to effect the speed change of the drive means.

3. A control apparatus according to claim 2, in which the signal producing means comprises a digital tachometer for mechanical coupling to said drive means, a counter for counting the signals emitted by said tachometer and a store which holds the signal value and in turn the subsequent updated signal values, counted by said counter between master clock pulses fed to said counter and said store.

4. A control apparatus according to claim 3, in which a latch circuit is coupled to an output of the comparator to hold said compensating signal.

5. A control apparatus according to claim 4, in which a digital to analogue converter connected to said latch circuit effects a conversion of said compensating signal, the resulting analogue signal controlling said drive means.

6. A control apparatus according to claim 3, in which compensation means are provided to effect a compensation for variation in the length of the conveyor means, said compensation means comprising a second digital tachometer for mechanical coupling to the conveyor means at the idling end thereof remote from the first mentioned tachometer, and a reversible counter receiving the signals from both tachometers and capable of being set with said value representing the effective length of the conveyor means, said reversible counter emitting an error signal determined by the difference between the set length and actual effective length of the conveyor means, said error signal being fed to a further input of said counter means on receipt of a master clock pulse to effect said compensation in the length of the conveyor means.

7. A control apparatus according to claim 1, incorporating analogue and digital techniques, in which said means for producing the article or batch signal comprises an analogue tachometer, an integrator and a store for holding the signal value at the output of the integrator and subsequent updated signal values, and said reference means comprises a settable voltage level store, wherein a subtractor connected to said comparator means effects sequential subtraction of said signal value in said store from said settable voltage level store, said comparator means effecting a comparison of the signal at the output of the settable voltage level store after each subtraction with the article or batch signal value and producing at the output of the comparator a signal which serves to enable the subtractor until the reducing signal value at the output of the settable store is below a predetermined value whereupon said comparator produces a compensating signal which serves to effect speed change of said drive means.

8. A control apparatus according to claim 7, in which compensation means are provided to effect a compensation in said settable store dependant upon the variation in the length of the conveyor means, said compensation means comprising a second analogue tachometer for mechanical coupling to the conveyor means at the idling end thereof remote from the first analogue tachometer, two further integrators for receiving the signals from said tachometers, and a difference circuit for receiving the integrated signals, the output of said difference circuit serving to effect a compensation in said settable voltage level store.

9. A manufacturing or treatment apparatus comprising at least two process stations in which articles or batches of articles are conveyed on endless conveyor means, conveyor mechanism between said two process stations for conveying said articles from one process station to the next, variable speed electric motors driving the endless conveyor means of said process stations and the conveyor mechanism respectively, and a control apparatus according to claim 1 for controlling the speed of the motor driving one of said endless conveyor means.

10. Apparatus according to claim 9, including a second process station in which the motor driving the conveyor means of a second process station is also provided with a control apparatus, electrical signal producing means for producing at its output an article or batch digital signal dependent upon the length of the conveyor means associated with one article or batch of articles, electrical reference means capable of being set with a digital value representing the effective length of the conveyor means, electrical comparator means for receiving the signals at the outputs of said signal producing means and said reference means and for determining whether the effective length of the conveyor is an exact multiple of the length associated with the article or batch, said comparator means producing at its output a signal proportional to the deviation from the exact multiple which serves to effect an increase or decrease of the speed of the drive means whereby an exact multiple is achieved.

11. Apparatus according to claim 10, in which said reference means comprises a settable digital counter and wherein a subtractor connected to said comparator means effects sequential subtraction of said article or batch signal from said counter, said comparator means effecting a comparison of the signal at the output of the counter after each subtraction with the article or batch signal from said electrical signal producing means and producing at the output of said comparator a signal which serves to enable the subtractor until the reducing number in the counter is below a predetermined value whereupon said comparator produces a compensating signal which serves to effect the speed change of the drive means, in which the signal producing means comprises a digital tachometer for mechanical coupling to said drive means, a counter for counting the signals emitted by said tachometer and a store which holds the signal value and in turn the subsequent updated signal values, counted by said counter between master clock pulses fed to said counter and said store, and in which compensation means are provided to effect a compensation for variation in the length of the conveyor means, said compensation means comprising a second digital tachometer for mechanical coupling to the conveyor means at the idling end thereof remote from the first mentioned tachometer, and a reversible counter receiving the signals from both tachometers and capable of being set with said value representing the effective length of the conveyor means, said reversible counter emitting an error signal determined by the difference between the set length and actual effective length of the conveyor means, said error signal being fed to a further input of said counter means on receipt of a master clock pulse to effect said compensation in the length of the conveyor means.

12. Apparatus according to claim 9, in which the motor driving the conveyor mechanism is controlled by cyclic control circuit comprising a digital tachometer for mechanical coupling of said motor, a counter connected to the output of the tachometer and which can be programmed with a dividing factor determined by the period of operation of the conveyor mechanism, a logic circuit connected to the output of the counter and capable of providing at its output a signal indicating the order of arrival of the timing pulses from said counter and a master clock pulse applied to said logic circuit, and means for determining the error occurring between the timing pulse and the clock pulse, and for providing a correcting signal to increase or decrease the speed of the motor.

13. Apparatus according to claim 12, in which a master pulse generator supplies pulses simultaneously to said cyclic control circuit and said control apparatus controlling each of the process stations.

14. Apparatus according to claim 13, in which the master pulse generator comprises a crystal oscillator, at least one divider, and a pulse generator capable of emitting at one output a first series of master clock pulses for simultaneous control of said cyclic control circuit and control apparatus, and a second series of master clock pulses of the same frequency as said first series for effecting resetting of the counters.

15. Apparatus according to claim 14, in which the pulse generator is a trigger circuit in which the pulses of said second series are initiated by the ends of the pulses of said first series respectively.

* * * * *